May 27, 1969     E. G. HEINRICH     3,446,278

NONFREEZING FLUID CONNECTION

Filed April 17, 1967

INVENTOR
Elmer G. Heinrich

BY
Hovey, Schmidt, Johnson & Hovey.
ATTORNEYS.

United States Patent Office 3,446,278
Patented May 27, 1969

3,446,278
NONFREEZING FLUID CONNECTION
Elmer G. Heinrich, Hays, Kans.
(4490 Garfield St., Denver, Colo. 80216)
Filed Apr. 17, 1967, Ser. No. 631,268
Int. Cl. F28d 7/00; A23c 3/02
U.S. Cl. 165—155                                4 Claims

ABSTRACT OF THE DISCLOSURE

A flexible fluid connection suitable for use in connecting house trailers to a water source. The connection includes a main flexible inlet line and a water conduit adapted for coupling with a hot water heater and extending adjacent the inlet line in thermal exchange relationship therewith. The water condit is adapted for returning the heating water to the cold water pipe of the water heater so that heating water is circulated through the conduit for preventing freezing of the main line.

---

This invention relates to fluid connections and, more particularly, to such a connection as is utilized for coupling a house trailer or the like with a water supply line.

Trailers of this type are ordinarily provided with self-containing plumbing and it is but necessary to attach the water inlet coupling at the exterior of the trailer to a source of water such as a city water hydrant or the like to supply water to the trailer system. To preserve the mobile characteristics of the trailer, the connection to the hydrant or other source is usually not permanent and may be effected through a flexible line. Thus, the attachment may be quickly and easily made or disengaged and precise positioning of the trailer with respect to the hydrant is not required.

The water inlet line is, however, subject to freezing. Various attempts have been made to eleminate this problem, including the installation of thermostatically controlled electrical heating units, applying insulation to the line, and even leaving a trickle of water flowing through certain appliances in the trailer to maintain a flow of water through the line. All of these methods for combating the freezing problem have drawbacks and are not generally very satisfactory. The electrical heating units require power consumption and are expensive to install and operate. The necessity for permitting a controlled leakage of water through plumbing appliances is both wasteful as well as a nuisance. Further, this method is not entirely satisfactory in preventing freezing, especially when the ambient temperature is subject to a relatively large drop in a short period of time.

The amount of insulation usually required to prevent freezing of lines of this type is quite large and detracts from the flexibility of the line. It is difficult to install insulation in the amounts required, especially at the points of connection of the line to the trailer and to the hydrant, and the insulation produces a bulky and unsightly appearance. The bulk of lines of this type also presents a transportation and storage problem when the trailer is moved from one location to another.

Accordingly, it is the primary object of this invention to provide a nonfreezing fluid connecting for structures such as house trailers or the like, which connection is reliable and is free of the foregoing disadvantages.

It is a further object of the invention to provide a nonfreezing connection which may be quickly and easily installed, is relatively easy and economical to fabricate from commercially available materials, and which operates from water-heating equipment already available in the house trailer.

Still a further object of the invention is to provide a water connection which is not bulky and which may be readily carried with the house trailer for connecting the latter to a water source at any desired location.

These and other objects of the instant invention will be further pointed out or will become apparent from the specification, claims and drawing.

Figure 1:
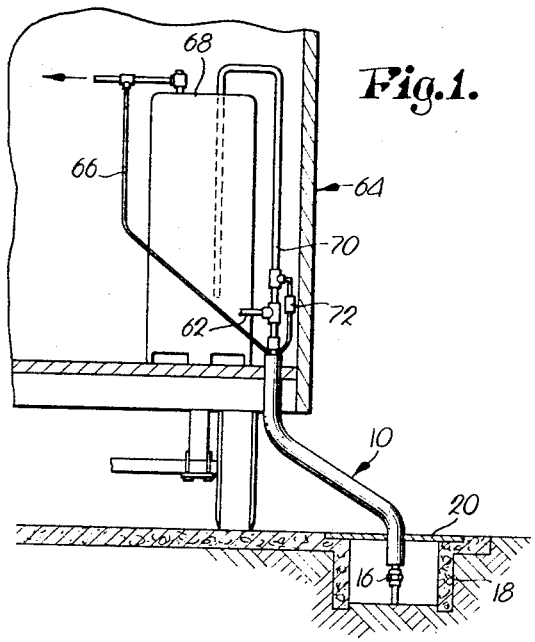
FIGURE 1 is a fragmentary, vertical, cross-sectional view through a house trailer and conventional water installation showing the connector embodying the principles of this invention in elevation and installed on the trailer and water source.

The connection or coupling of this invention is broadly designated by the numeral 10 and includes a central, flexible, elongated line 12 having one end 14 adapted to be coupled to a source 16 such as a city water hydrant or the like. Source 16 may be conventionally disposed in a location protected from freezing temperatures as in a well 18 extending below the surface of the ground and protected by a cover 20. It will be understood, however, that source 16 could be located within a building or the like.

Figure 2:
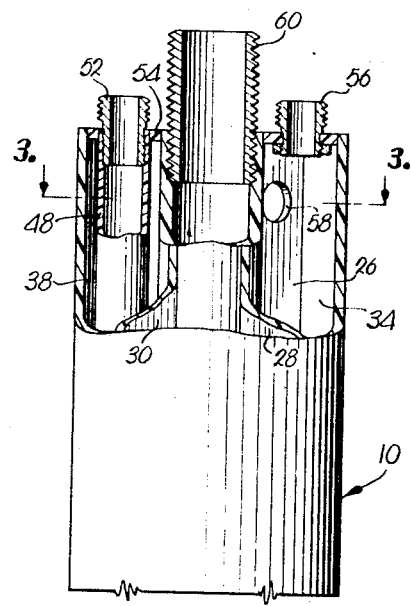
FIG. 2 is a fragmentary, enlarged, front elevational view of the connector, parts being broken away and shown in cross section to reveal details of construction.
Figure 3:
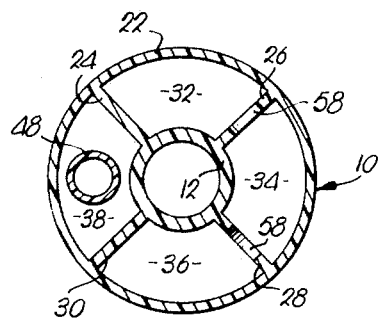
FIG. 3 is a cross-sectional view taken along line 3—3 of FIG. 2.
Figure 4:
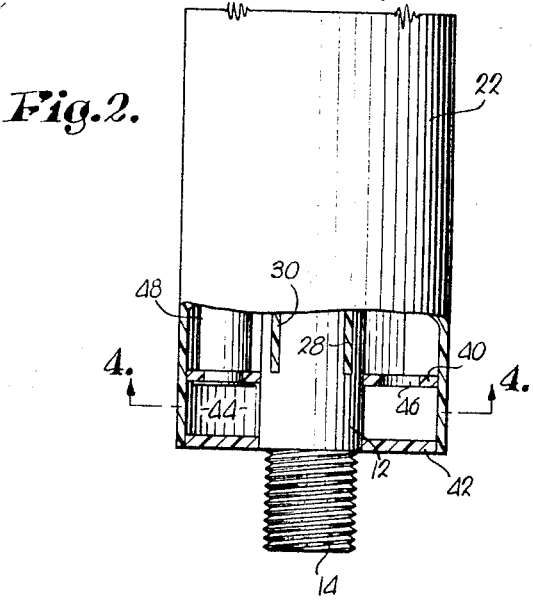
FIG. 4 is a cross-sectional view taken along line 4—4 of FIG. 2.
Figure 4:
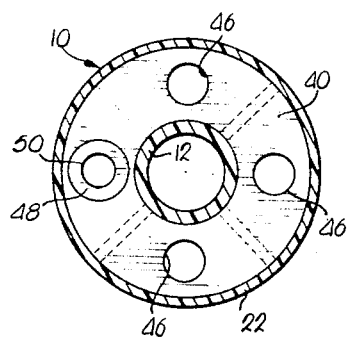

A cylindrical housing 22 completely encircles line 12 and extends substantially throughout the length of the latter in concentric, spaced relationship from the outer surface of line 12. A plurality of radially extending side walls or partitions 24, 26, 28 and 30 maintain the concentric, spaced relationship between housing 22 and line 12, and also separate the space between housing 22 and line 12 into respective chambers or compartments 32, 34, 36 and 38 extending longitudinally of the coupling 10. Partitions 24–30 terminate short of the lowermost end of housing 22 as illustrated best in FIG. 2. A transversely extending wall 40 joins with the lowermost ends of partitions 24–30 and is secured to the latter to provide a bottom for the respective chambers 32–38.

A transversely extending wall 42 disposed in spaced relationship from wall 40 closes the lowermost end of housing 22 and defines a cavity 44 between walls 40 and 42 and surrounding the outer surface of line 12. Cavity 44 is placed into communication with chambers 32, 34 and 36 by apertures 46 in wall 40. A tube 48 extends longitudinally within chamber 38 and is in communication with cavity 44 through an opening 50 in wall 40 at the lowermost end of chamber 38.

The outer surface of tube 48 is maintained in spaced relationship from the outer surface of line 12 for a purpose to be described hereinafter. The upper end of tube 48 terminates in a connection 52 extending through a top closure 54 for housing 22. Another connection 56 extends through closure 54 in overlying relationship to compartment 34 and the latter is placed in communication with the adjacent compartments 32 and 36 by openings 58 in walls 26 and 28 in the proximity of closure 54. A connection 60 communicates the upper end of line 12 through closure 54 and is adapted to be coupled with cold water line 62 forming a part of the plumbing system on the interior of a house trailer 64. Connection 52 of tube 48 is adapted to be connected to the hot water line 66 emanating from the hot water heater 68 of the trailer. Connection 56, on the other hand, is adapted to be coupled with the cold water line 70 feeding into the water heater 68.

In operation, with the connections previously described, hot water emanating from heater 68 is conducted by tube 48 to cavity 44 surrounding the end of line 12 proximal the water source 16. The spacing of tube 48 from housing 22 and from line 12 serves to insulate the tube and keep the water hot until it reaches cavity 44. The hot water enters compartments 32, 34 and 36 through respective apertures 46 in wall 40, whereupon the water travels in the conduit formed by compartments 32–36 and along line 12. Throughout its travel in the conduit, the water is in thermal exchange relationship with line 12 to maintain the latter heated and to prevent the water in line 12 from freezing. The water which has been cooled by passing through the conduit is reintroduced to the water heater 68 through line 70. It is not necessary to utilize separate pumping apparatus inasmuch as the temperature differential between the water in line 66 and the water in line 70 causes a continuous current whereby heated water continuously emanates from the outlet of tube 48 for flowing into the inlet of the conduit formed by compartments 32–36 at the end of the line 12 located closest source 16. The hot water which maintains the line from freezing is reheated by heater 68 and a constant supply of heating water is always available for coupling 10. If desired, a check valve 72 may be interposed between the outlet connection 56 and the cold water line 70 to prevent back surges or reverse flow of water in the circuit.

Line 12, walls 24–30 and housing 22 may all be extruded in a simple operation by readily available methods and with the use of flexible material such as rubber, plastic or the like. The coupling is not only relatively inexpensive to produce and operate, but is also relatively lightweight, is not bulky, and is sufficiently flexible to insure quick and easy attachment of the plumbing system of the trailer with the water source. Manifestly, the principles of this invention can be utilized for providing a fluid inlet to structures other than house trailers. However, it will be readily recognized that the coupling of this invention is particularly well suited for providing the necessary water inlet installation for insuring a nonfreezing water supply to house trailers, mobile homes and the like.

Having thus described the invention, what is claimed as new and desired to be secured by Letters Patent is:

1. A heated coupling for conducting fluids from a source to a structure having a water heater provided with a hot water pipe and a cold water pipe, said coupling comprising:
    an elongated line adapted to be coupled at one end thereof to said source;
    an elongated conduit including a housing disposed longitudinally of the line in circumscribing disposition around the line and in thermal exchange relationship to the latter throughout at least a portion of the length of the line, said conduit having an inlet end thereof disposed proximal said one end of the line; and
    a tube in communication with said inlet end of the conduit and adapted to be coupled to said hot water pipe for supplying hot water to the conduit, the outlet end of said conduit being adapted to be coupled with the cold water pipe for introducing the water into said cold water pipe for reheating by said heater after the water has passed through the conduit to warm the line, whereby water for heating the line is circulated through said conduit,
    said housing including longitudinally extending partition means dividing the conduit into a plurality of elongated chambers, said partition means being provided with openings therethrough placing said chambers in communication with one another,
    said housing being of elongated, cylindrical configuration completely encircling said line, said conduit including a pair of longitudinally extending side walls spanning the distance between the inner surface of the housing and the outer surface of the line, said conduit being located between said side walls, and the tube being disposed in said housing and exteriorly of said conduit.

2. The invention of claim 1, including a first transverse wall encircling said line adjacent said one end of the latter and closing the proximal end of the housing, and a second transverse wall spaced inwardly of the housing from said first wall and defining a cavity therebetween, said tube and the conduit communicating with said cavity.

3. The invention of claim 1, said line being disposed in concentric relationship with said housing with said side walls being disposed radially with respect to the axis of the line.

4. The invention of claim 3, said tube, side walls and housing being of integral, one-piece extruded construction.

References Cited

UNITED STATES PATENTS 3,319,709  5/1967  Strunk _____ 165—142 XR

FOREIGN PATENTS 1,363,650  5/1964  France.
970,630  10/1958  Germany.
378,210  8/1932  Great Britain.

FRED C. MATTERN, Jr., *Primary Examiner.*

M. ANTONAKAS, *Assistant Examiner.*

U.S. Cl. X.R.

165—66; 237—80